US012698149B2

(12) United States Patent
Nuijen et al.

(10) Patent No.: US 12,698,149 B2
(45) Date of Patent: Aug. 4, 2026

(54) AEROSOL DISPENSING DEVICE AND METHOD FOR MANUFACTURING AN AEROSOL DISPENSING DEVICE

(71) Applicant: Weener Plastics Group B.V., Ede (NL)

(72) Inventors: Henricus Johannes Cornelius Nuijen, Linden (NL); Jolijn Marion Schoofs, Valkenswaard (NL)

(73) Assignee: Weener Plastics Group B.V., Ede (NL)

( * ) Notice: Subject to any disclaimer, the term of this patent is extended or adjusted under 35 U.S.C. 154(b) by 313 days.

(21) Appl. No.: 18/032,222

(22) PCT Filed: Oct. 21, 2021

(86) PCT No.: PCT/EP2021/079241
§ 371 (c)(1),
(2) Date: Apr. 17, 2023

(87) PCT Pub. No.: WO2022/084459
PCT Pub. Date: Apr. 28, 2022

(65) Prior Publication Data
US 2023/0391539 A1 Dec. 7, 2023

(30) Foreign Application Priority Data
Oct. 22, 2020 (NL) ...................................... 2026729

(51) Int. Cl.
*B65D 83/14* (2025.01)
*B05B 1/34* (2006.01)
(Continued)

(52) U.S. Cl.
CPC ........ *B65D 83/7532* (2013.01); *B05B 1/3436* (2013.01); *B05B 15/65* (2018.02); *B65D 83/206* (2013.01)

(58) Field of Classification Search
CPC .. B65D 83/7532; B65D 83/206; B05B 15/65; B05B 1/3436
(Continued)

(56) References Cited

U.S. PATENT DOCUMENTS 3,437,270 A * 4/1969 Frank, Jr. ........... B65D 83/7535 239/337
6,557,783 B1 * 5/2003 Foster ................... B05B 1/3468 239/333
(Continued)

FOREIGN PATENT DOCUMENTS

CN 101873894 A 10/2010
CN 202447229 U 9/2012
(Continued)

*Primary Examiner* — Steven J Ganey
(74) *Attorney, Agent, or Firm* — Hoffmann & Baron, LLP

(57) ABSTRACT

An aerosol dispensing device for placement on an aerosol container having a valve stem. The device includes an actuator adapted to operate the valve stem. A spray nozzle insert is positioned in the actuator. The spray nozzle insert includes an end wall having a spray orifice therethrough. A cylindrical wall connected to the inner side of the end wall is arranged concentric with the spray orifice. The spray nozzle insert has at least two snap fingers at a radial distance outside the cylindrical wall. The actuator has at least two guiding ribs configured to guide each snap finger upon positioning the spray nozzle insert in the actuator. The snap finger has a snap member which is snapped behind an inward end of the guiding rib.

16 Claims, 5 Drawing Sheets

(51) Int. Cl.
*B05B 15/65* (2018.01)
*B65D 83/206* (2025.01)

(58) Field of Classification Search
USPC ..... 239/333, 337, 390, 552, 600; 222/321.1, 222/402.1, 402.13
See application file for complete search history.

(56) References Cited

U.S. PATENT DOCUMENTS

| | | | | |
|---|---|---|---|---|
| 8,616,417 | B2 | 12/2013 | Neuhaus | |
| 8,640,977 | B2 * | 2/2014 | Songbe | B05B 1/3436 222/402.1 |
| 10,370,177 | B2 * | 8/2019 | Cassidy | B65D 83/753 |
| 2009/0057447 | A1 | 3/2009 | Lowry et al. | |
| 2009/0078793 | A1 | 3/2009 | Nelson et al. | |
| 2012/0111898 | A1 | 5/2012 | Neuhaus | |
| 2013/0221122 | A1 | 8/2013 | Ganan-Calvo et al. | |
| 2014/0367490 | A1 * | 12/2014 | Neuhalfen | B65D 83/28 222/402.1 |
| 2019/0308208 | A1 | 10/2019 | Hayward et al. | |
| 2020/0315154 | A1 | 10/2020 | Godia | |

FOREIGN PATENT DOCUMENTS

| | | | |
|---|---|---|---|
| CN | 110072631 | A | 7/2019 |
| CN | 111565568 | A | 8/2020 |
| DE | 10 2009 030 627 | A1 | 12/2010 |
| JP | 2015-16913 | A | 1/2015 |
| WO | 03/045571 | A1 | 6/2003 |

* cited by examiner

AEROSOL DISPENSING DEVICE AND METHOD FOR MANUFACTURING AN AEROSOL DISPENSING DEVICE

CROSS-REFERENCE TO RELATED APPLICATIONS

This application is the National Stage of International Application No. PCT/EP2021/079241, filed Oct. 21, 2021, which claims the benefit of Netherlands Application No. 2026729, filed Oct. 22, 2020, the contents of which is incorporated by reference herein.

FIELD OF THE INVENTION

The present invention relates to an aerosol dispensing device for placement on an aerosol container having a valve stem of an operable valve at the top of the container. The aerosol dispensing device comprises an actuator including a flow channel adapted to operate the valve stem of the container and a spray nozzle insert positioned in the actuator.

BACKGROUND OF THE INVENTION

US 2009/0020621 shows a plastic aerosol cap comprising an actuator with a spray nozzle insert positioned at the end of a flow channel.

Typically the actuators of the aerosol dispensing devices known from the prior art are made of polypropylene (PP) and the conventional spray nozzle inserts are made of polyoxymethylene (POM). POM is known for its strength, hardness and rigidity. In the specific application of spray nozzle inserts it is a suitable plastic material because of its dimensional stability and because it is not prone to relaxation. Relaxation of the material could loosen the fitting of the insert in the actuator, which is undesirable because it is loaded with high pressure from the aerosol during use.

Currently the recycling of plastic materials becomes more and more important. Although POM is very suitable for the purpose of making a form stable spray nozzle insert, it causes a problem when the aerosol dispensing head has to be recycled. The POM insert is hardly removable from the aerosol dispensing head by the consumer. Thus, when the PP is recycled, the POM part remains in the PP part and constitutes an impurity in the PP when the spray head is processed in the recycling process. This makes the resulting recycled PP less pure and therefore less usable.

It is an object of the invention to provide an aerosol dispensing head which is better suitable for recycling.

This object is achieved by an aerosol dispensing head according to the invention.

SUMMARY OF THE INVENTION

An aerosol dispensing device for placement on an aerosol container having a valve stem of an operable valve at the top of the container, the aerosol dispensing device comprising:

an actuator adapted to operate the valve stem of the container and including a flow channel having an inlet end adapted to be coupled with the valve stem of the aerosol container and an outlet end, wherein the actuator has a nozzle head at the outlet end of the flow channel, the nozzle head having a central post and a circumferential wall concentrically surrounding the central post, the central post and the circumferential wall defining between them an annular chamber, wherein the central post has a flat end surface at which the outlet of the flow channel is located, a spray nozzle insert comprising an end wall having a spray orifice therethrough, the end wall having an outer side and an inner side, wherein a cylindrical wall connected to the inner side of the end wall is arranged concentric with the spray orifice, the spray nozzle insert being positioned in the actuator, wherein the cylindrical wall of the spray nozzle insert is located in the annular chamber of the nozzle head and the flat end surface of the central post is in abutment with the inner side of the end wall of the spray nozzle insert, wherein the spray nozzle insert has at least two snap fingers located at a radial distance outside the cylindrical wall, said snap fingers extending from the inner side of the end wall, wherein the actuator has at least two first guiding ribs spaced apart from an outer side of the circumferential wall of the nozzle head configured to guide each snap finger upon positioning the spray nozzle insert in the actuator, wherein the snap finger has a snap member which is snapped behind an inward end of the first guiding rib in a fully inserted state.

The snap fingers, that according to the invention are located at some distance from the cylindrical wall, allow the end wall between the fingers and the cylindrical wall to be bent to some extent when the snap fingers are placed in their snapped position. This results in a pretension in the end wall when the snap member is snapped behind the inward end of the first guiding rib. This pretension has the effect that even when the plastic material of the spray nozzle insert would suffer from relaxation, the snap fingers would still remain sufficiently tensioned to maintain the insert on its place and in particular maintain the flat end surface of the central post of the nozzle head in abutment with the inner side of the end wall of the spray nozzle insert. Thereby is warranted that the insert is held in the actuator in a sealing manner and that a good quality spray is created by the insert and ejected through the orifice. Furthermore is warranted that the insert is not ejected inadvertently from the actuator.

Due to the configuration of the nozzle insert and the actuator according to the invention the insert does not have to be made necessarily from POM. Thus a material can be used for making the insert which shows some relaxation over time but provides a better recyclability. In a preferred embodiment the insert is made of PP, just like the actuator.

In a preferred embodiment the circumferential wall of the nozzle head defines a support surface, which supports an annular area of the inner side of the end wall of the spray nozzle insert adjacent the outside of the cylindrical wall of the insert. The engagement of the support surface and the annular area of the inner side of the end wall provides a tight sealing which prevents the medium to be dispensed to leak from the nozzle head.

Preferably the distance between the support surface and the inward end of the first guiding rib is such that the spray nozzle insert is provided with a pretension when the spray nozzle insert is positioned in the actuator.

In a further embodiment second guiding ribs are formed spaced apart from each of the first guiding ribs, wherein during assembly the snap member of the respective snap fingers moves through a passage formed by the first and second guiding ribs, wherein the second guiding rib locks the snap member in the snapped state when the snap member is snapped behind the inward end of the first guiding rib.

In a possible embodiment the respective second guiding ribs are located inwardly from the respective first guiding rib.

The second guiding rib has a guiding portion having an inclined orientation with respect to an insertion direction of the snap finger, which forces the head in the direction of the first rib.

In a further embodiment the second guiding ribs are formed on the nozzle head.

In a possible embodiment the end wall of the spray nozzle insert has substantially an oblong shape, wherein the snap fingers extend from opposite smaller sides of the oblong shape. In a further embodiment the snap fingers have the same width as the smaller sides of the oblong end wall.

In a possible embodiment the inner side of the end wall of the insert is provided with a recessed swirl chamber surrounding the spray orifice and recessed feed grooves extending from the cylindrical wall towards the swirl chamber.

The invention also relates to an aerosol cap comprising an aerosol dispensing device according to any of the preceding claims, and furthermore comprising a cap body having a circumferential wall and having an open bottom end to be placed on and connected with the aerosol container, wherein the actuator is hingedly connected to the cap body. Preferably the cap body and the actuator are formed in one piece.

The invention furthermore relates to an aerosol container provided with an aerosol dispensing device as defined in the above.

The invention furthermore relates to a spray nozzle insert for an aerosol dispensing device as defined in the above.

The invention also relates to a spray nozzle insert for being positioned in an actuator of an aerosol dispensing device, the spray nozzle insert comprising an end wall having a spray orifice therethrough, the end wall having an outer side and an inner side, wherein a cylindrical wall connected to the inner side of the end wall is arranged concentric with the spray orifice, wherein the spray nozzle insert has at least two snap fingers located at a radial distance outside the cylindrical wall, said snap fingers extending from the inner side of the end wall, wherein the snap finger has a snap member for a snapping cooperation with a counter part in the actuator.

The invention also relates to a method for manufacturing an aerosol dispensing device, including the following steps:

- providing an actuator adapted to operate the valve stem of the container and including a flow channel having an inlet end adapted to be coupled with the valve stem of the aerosol container and an outlet end, wherein the actuator has a nozzle head at the outlet end of the flow channel, the nozzle head having a central post and a circumferential wall concentrically surrounding the central post, the central post and the circumferential wall defining between them an annular chamber, wherein the central post has a flat end surface at which the outlet of the flow channel is located, wherein the actuator has at least two first guiding ribs spaced apart from an outer side of the circumferential wall of the nozzle head;
- providing a spray nozzle insert comprising an end wall having a spray orifice therethrough, the end wall having an outer side and an inner side, wherein a cylindrical wall connected to the inner side of the end wall is arranged concentric with the spray orifice, wherein the spray nozzle insert has at least two snap fingers located at a radial distance outside the cylindrical wall, said snap fingers extending from the inner side of the end wall, wherein the snap finger has a snap member; and
- positioning the spray nozzle insert in the actuator, wherein the cylindrical wall of the spray nozzle insert is located in the annular chamber of the nozzle head and the flat end surface of the central post is brought in abutment with the inner side of the end wall of the spray nozzle insert, and wherein each snap finger is guided by a guiding rib until the snap member snaps behind an inward end of the guiding rib.

In the method the actuator is made by injection moulding it from a suitable plastics material, preferably PP or PE. The spray nozzle insert is made separately by injection moulding it from a suitable plastics material, preferably the same or at least recyclable with the material of the actuator. The actuator may be injection moulded as a part of an aerosol cap as described in the above.

The invention will be further elucidated in the following description with reference to the drawings.

DETAILED DESCRIPTION OF THE INVENTION

Figure 1:
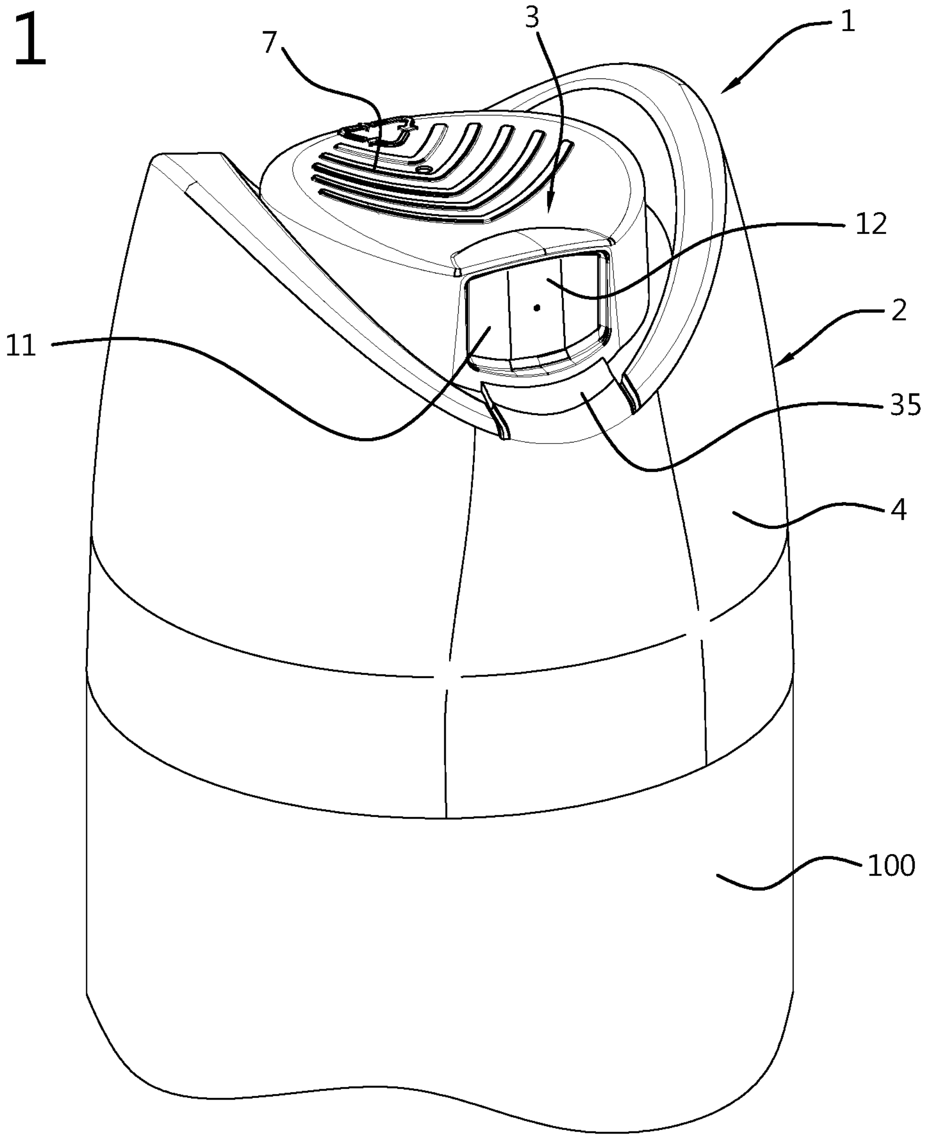
FIG. 1 shows a front view in perspective of an embodiment of an aerosol cap according to the invention.
Figure 1A:
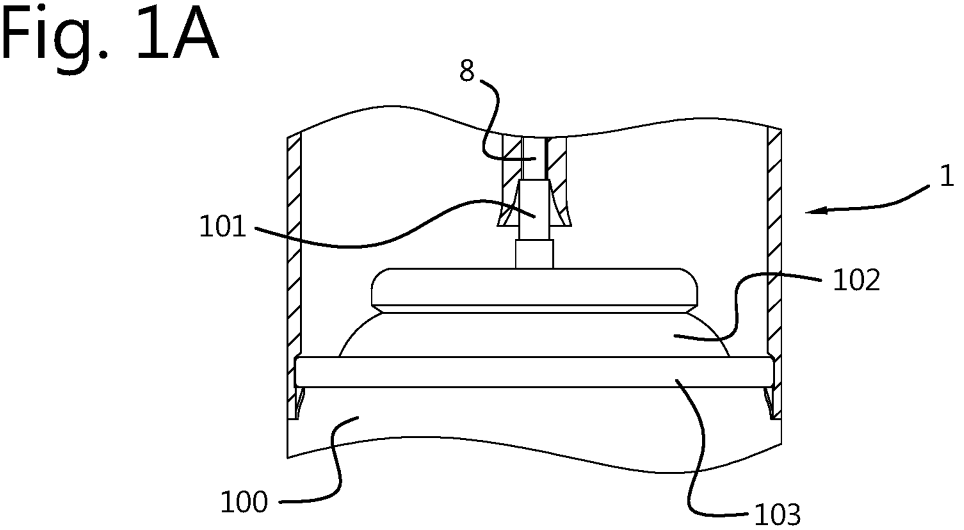
FIG. 1A illustrates in a cross sectional view the aerosol cap of FIG. 1 mounted on the container.
Figure 2:
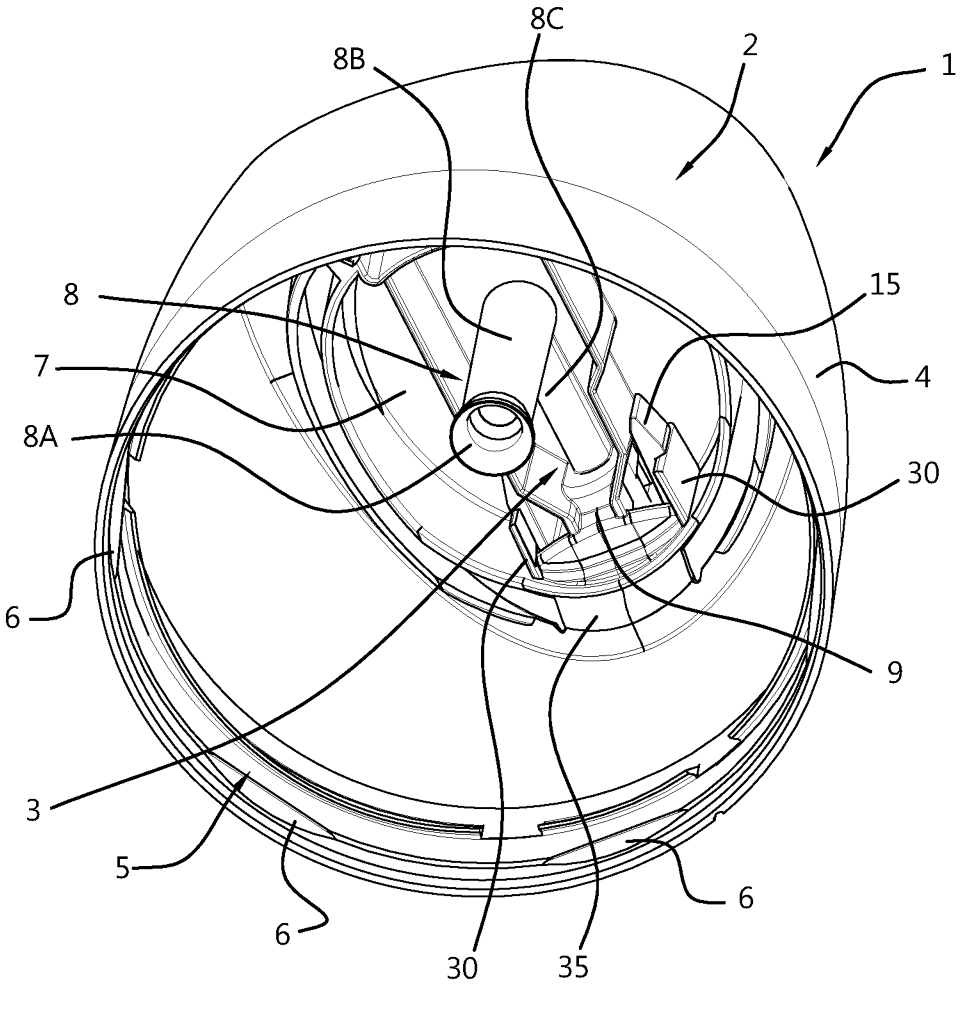
FIG. 2 shows a view from below in perspective of the aerosol cap of FIG. 1.
Figure 3:
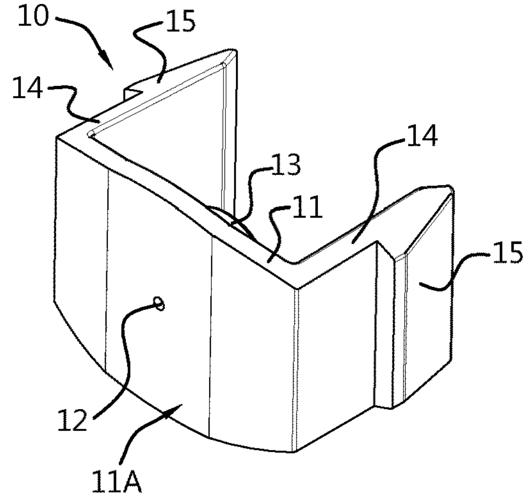
FIG. 3 shows a view in perspective of a spray nozzle insert for the aerosol cap of FIG. 1.
Figure 4:
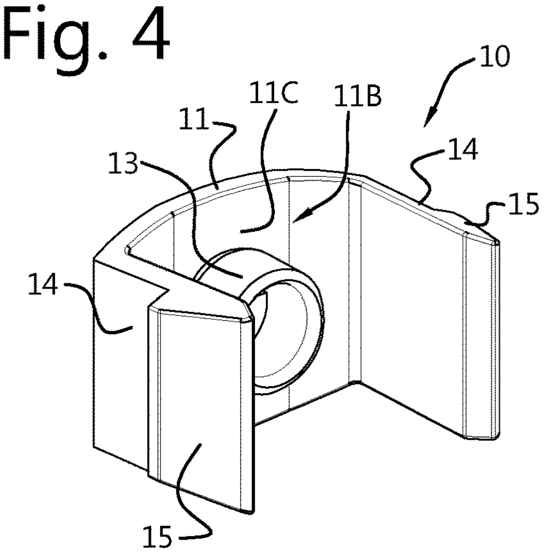
FIG. 4 shows another view in perspective of the spray nozzle insert of FIG. 3.

In FIGS. 1 and 1A is shown an aerosol dispensing device embodied as an aerosol cap 1 which is mounted on an aerosol container 100. FIG. 2 shows the cap 1 from below when it is not placed on the container.

The aerosol container 100 may typically be a substantially cylindrical metal (usually aluminium) can having an opening at a top end which is sealed by a valve cup 102. The valve cup is attached to the container by a crimping connection. The valve cup holds a valve assembly which includes a valve stem 101. The aerosol container may be an aerosol container that contain a product, e.g. a fluid, to be dispensed and a propellant gas mixed with the product to expel the product out of the container when the valve of the valve assembly is opened. Also other types of aerosol containers are possible, for example bag-on-valve type containers, in which the product to be dispensed, e.g. a fluid, is contained in a bag, which is arranged inside the container.

The container around the bag is pressurized with compressed gas, e.g. air or nitrogen as propellant. The valve stem 101 is able to operate the valve when it is pushed in or sideways, such that the valve opens and the product, e.g. a fluid, is expelled from the container by a propellant gas. The valve stem 101 is a tubular member through which the fluid will flow. The valve stem may be the valve stem of a so called male valve, as is shown in FIG. 1A, as well as of a female valve, which is well known for the person skilled in the art. The valve stem will in many applications be connected to a spray nozzle which forms the flowing fluid into a spray. The spray nozzle is often comprised in an aerosol spray cap.

The aerosol cap 1 comprises two main components: a cap body 2 and an actuator 3 which is moveable with respect to the cap body 2.

The cap body 2 comprises a circumferential wall 4 which defines an open end 5 at a bottom end of the body 2. Near the open end 5 the circumferential wall 4 has beads 6 (cf. FIG. 2) or other protrusions which can snap behind a ridge 103 of the container 100. The ridge of the container can for example be formed by the crimped connection of the valve disc 102 connected to the spray can 100. Once the cap body 2 is snapped on the aerosol container, the cap body 2 of this particular embodiment cannot be pulled of the container again without the use of undue force.

The actuator 3 comprises a push button 7 and a flow channel 8 that is, at least in the shown embodiment, integrally formed on an underside of the push button 7. The flow channel 8 has an inlet end 8A which is colinear with the central axis of the cap body 2 of the aerosol cap 1. In the embodiment shown, the flow channel 8 has two perpendicular portions 8B and 8C adjoining each other. The inlet end 8A located at the end of the portion 8B of the flow channel 8 is suitable to be connected with the valve stem 101 of the aerosol container. When in use the push button 7 is pushed in, the flow channel 8 will be pushed towards the aerosol container whereby the valve stem 101 is pushed in. This opens the valve and content of the pressurized aerosol container 100 is ejected into the flow channel 8 at the inlet end 8A.

The flow channel 8 has an outlet end 8D. At the outlet end 8D a nozzle head 9 is formed as is best visible in FIGS. 9-12. The nozzle head 9 has a central post 18 and a circumferential wall 19 concentrically surrounding the central post 18. The central post 18 and the circumferential wall 19 define between them an annular chamber 20. The central post 18 has a flat end surface 21 at which the outlet of the flow channel 8 is located.

A spray nozzle insert 10 is positioned in the actuator 3 at the nozzle head 9. The spray nozzle insert 10 is shown in detail in FIGS. 3-8. The spray nozzle insert 10 comprises an end wall 11 having a spray orifice 12 therethrough. The end wall 11 has an outer side 11A and an inner side 11B. A cylindrical wall 13 connected to the inner side 11B of the end wall 11 is arranged concentrically with the spray orifice 12.

Figure 5:
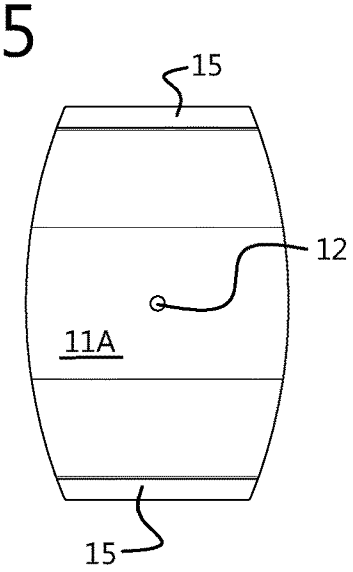
FIG. 5 shows a front view of the spray nozzle insert of FIG. 3.
Figure 6:
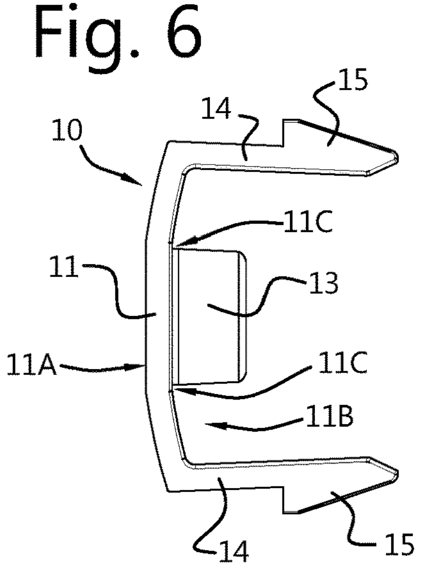
FIG. 6 shows a side view of the spray nozzle insert of FIG. 3.
Figure 7:
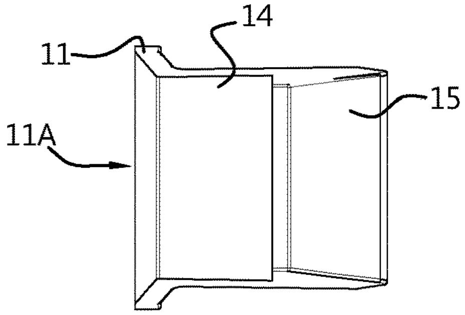
FIG. 7 shows another side view of the spray nozzle insert of FIG. 3.
Figure 8:
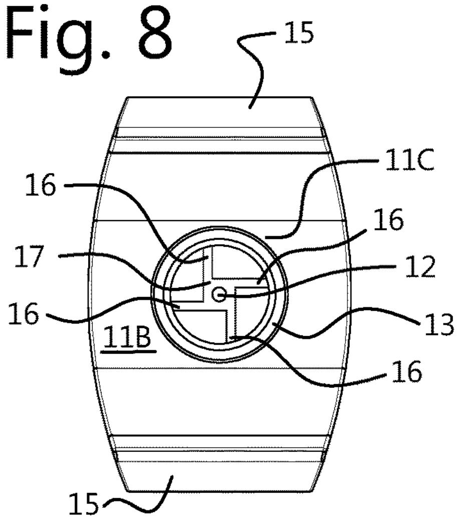
FIG. 8 shows a rear view of the spray nozzle insert of FIG. 3.
Figure 9:
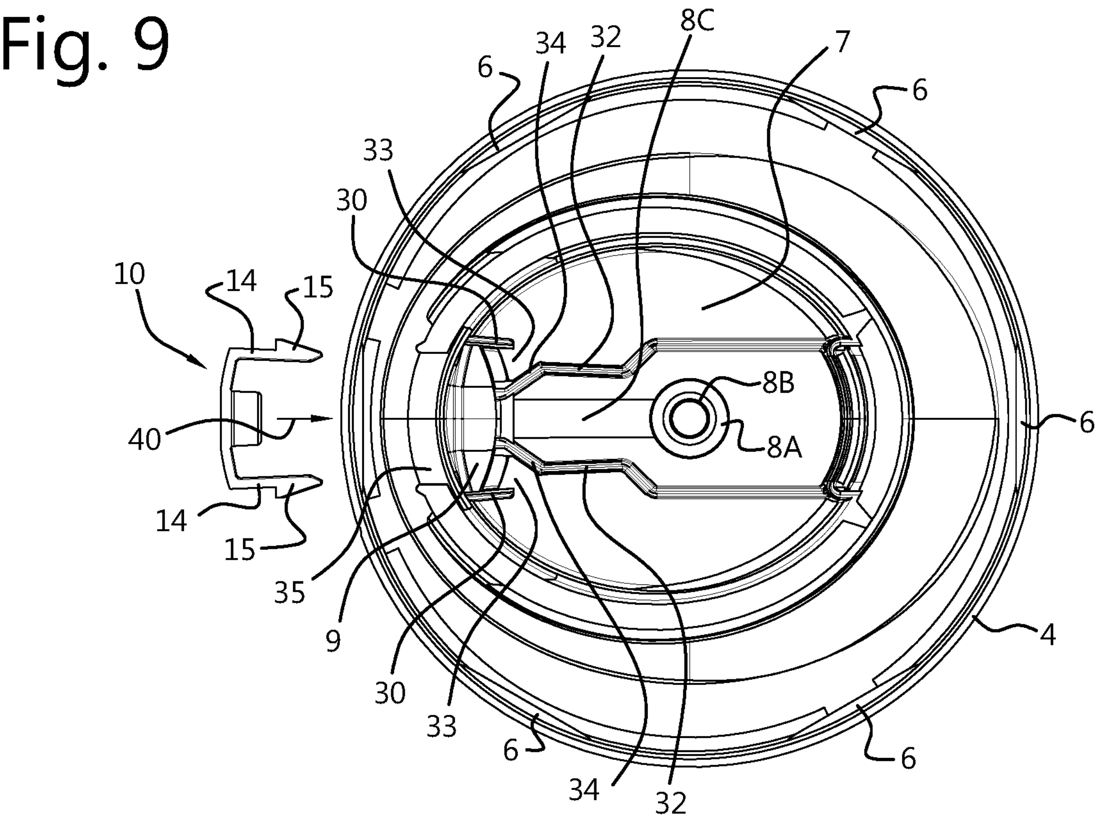
FIG. 9 illustrates in a bottom view how the insert of FIG. 3 is positioned in the aerosol cap of FIG. 1.
Figure 10:
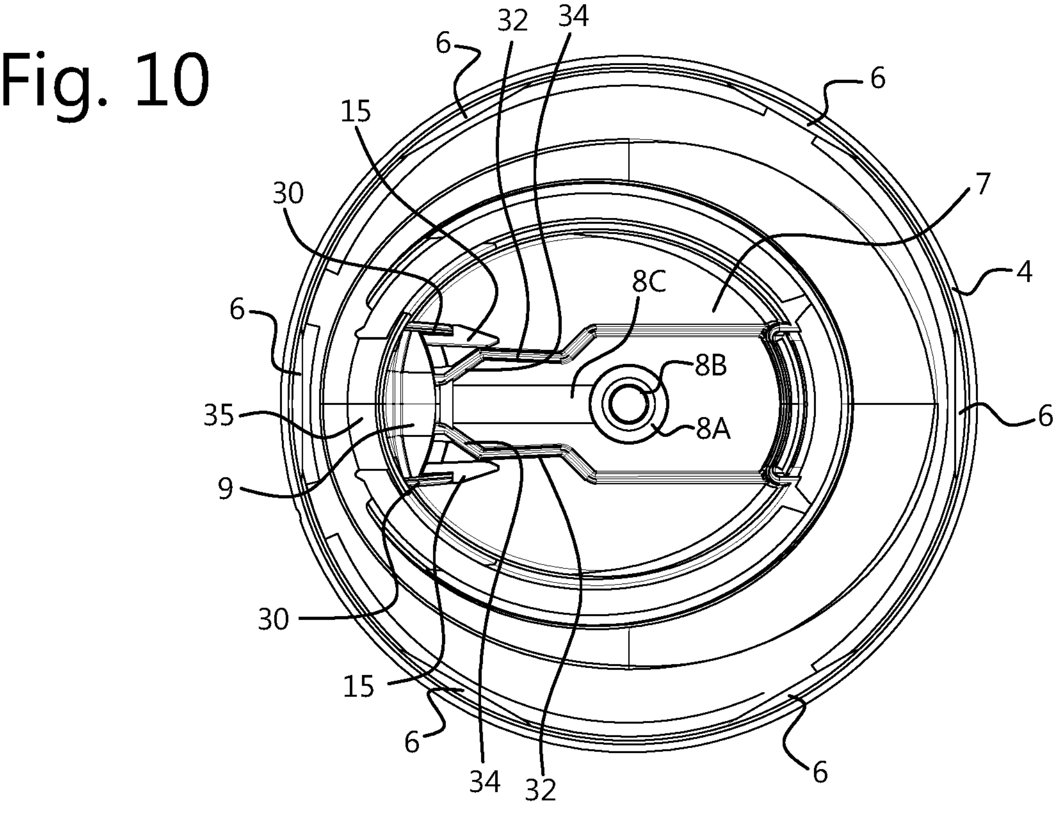
FIG. 10 shows a bottom view of the aerosol cap of FIG. 1 with the insert of FIG. 3 in position.
Figure 11:
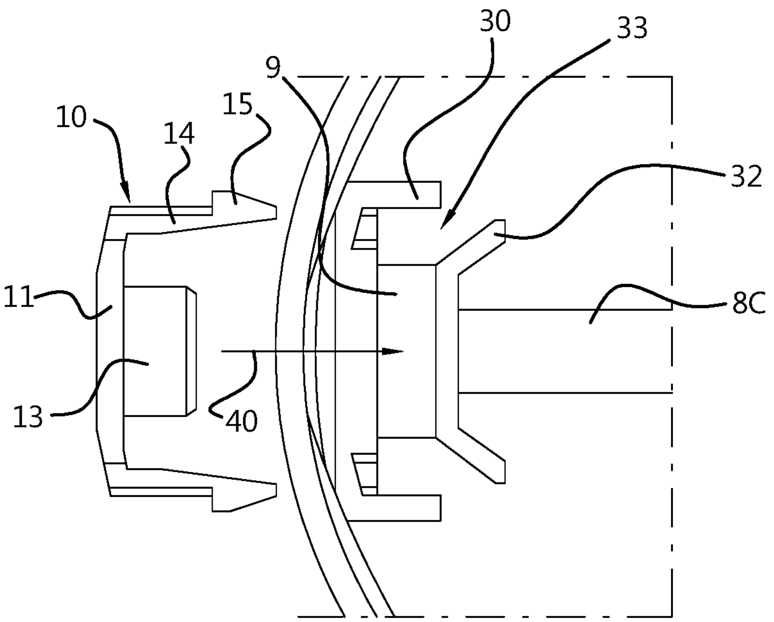
FIG. 11 illustrates in a detail how the insert of FIG. 3 is positioned in the aerosol cap of FIG. 1.

The end wall 11 of the spray nozzle insert 10 has substantially an oblong shape, which is best seen in FIGS. 5 and 8. Snap fingers 14 extend from opposite smaller sides of the oblong shape. In this embodiment the snap fingers 14 have the same width as the smaller sides of the oblong end wall 11.

The snap fingers 14 are located at a radial distance outside the cylindrical wall 13. Each snap finger 14 has a snap member 15 which is able to hook behind a complementary hooking edge.

The actuator 3 has at least two first guiding ribs 30 spaced apart from an outer side of the circumferential wall 19 of the nozzle head 9 configured to guide each snap finger 14 upon positioning the spray nozzle insert 10 in the actuator 3. Each snap finger 14 has a snap member 15 which, in a fully inserted state, is snapped behind an inward end 31 of the first guiding rib 30. The inward end 31 of the first guiding rib 30 is thus the aforementioned complementary hooking edge.

Figure 12:
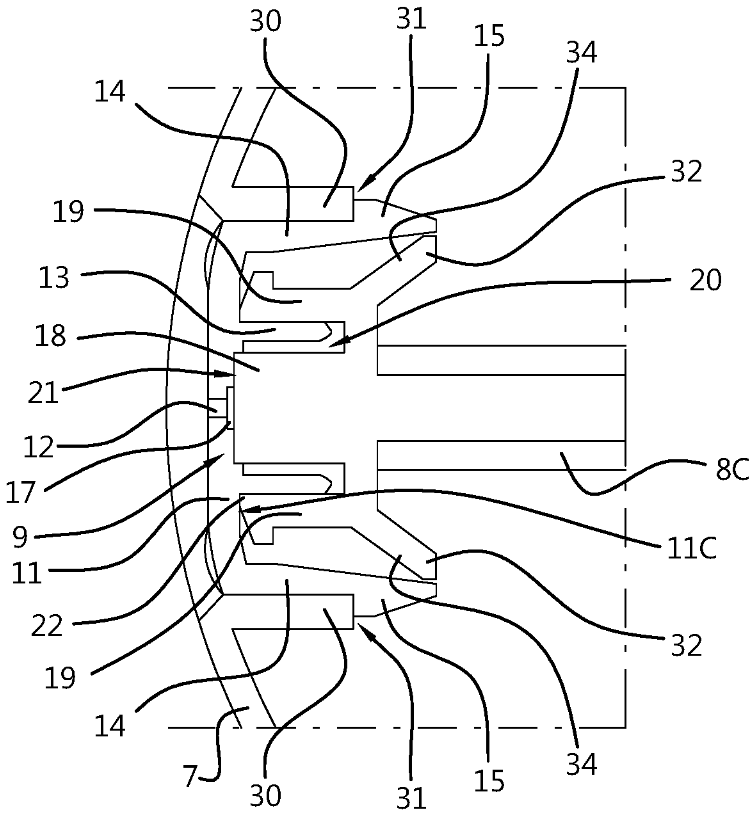
FIG. 12 illustrates in a cross section the insert of FIG. 3 in position in the aerosol cap of FIG. 1.

The spray nozzle insert 10 is positioned in the actuator 3, wherein the cylindrical wall 13 of the spray nozzle 10 insert is located in the annular chamber 20 of the nozzle head 9 as is best seen in FIG. 12. The flat end surface 21 of the central post 18 is in abutment with a portion of the inner side 11B of the end wall 11 that is situated within the contour of the cylindrical wall 13.

As can be seen in FIG. 8, the portion of the end wall 11 within the cylindrical wall 13 is provided with grooves 16 extending from the edge towards a swirl chamber 17 that surrounds the orifice 12 at the inner side of the end wall 11. The liquid flow from the aerosol container is broken up and transformed into a spray at the swirl chamber 17. It is noted that such grooves 16 may be desirable for dispensing some products, but that there also products to be dispensed for which the grooves 16 are not necessary or not desirable, for example in deodorants with particles in it. In some embodiments the grooves may thus be omitted. Furthermore is noted that the grooves 16 in this example are straight and extend perpendicular and parallel to each other. It is however also possible to have other groove shapes, for example including curved grooves in a spiral or vortex configuration.

The circumferential wall 19 of the nozzle head 9 defines a support surface 22, which supports an annular area 11C of the inner side 11B of the end wall of the spray nozzle insert 10 adjacent the cylindrical wall 13. The distance between the support surface 22 and the inward end 31 of the guiding rib 30 is such that the spray nozzle insert 10 is provided with a pretension when the spray nozzle insert 10 is positioned in the actuator 3.

Respective second guiding ribs 32 are formed spaced apart from the respective first guiding ribs 30. The respective second guiding ribs 32 are located inwardly from the respective first guiding ribs 30, as is visible in FIGS. 9-12. The second guiding ribs 32 adjoin the rear side of the nozzle head 9 and are connected to, preferably formed integrally with, an underside of the push button 7. During assembly the snap member 15 of the respective snap fingers 14 moves through a passage 33 (see FIGS. 9 and 11) formed by the first guiding rib 30 and the second guiding rib 32. The second guiding ribs 32 have a guiding portion 34 having an inclined orientation with respect to an insertion direction indicated by arrow 40. The inclined guiding portion 34 forces the head 15 in the direction of the first rib 30. The second guiding rib 32 locks the snap member 15 in position when the snap member 15 is interlocked with the inward end 31 of the first guiding rib 30.

Polypropylene (PP) is a suitable material to make the cap body 2 and the actuator 3 from by means of a injection moulding process. Preferably the actuator and cap body are made in one piece, such that the actuator 3 is connected to the cap body 2 by a hinge member 35, e.g. a sort of film hinge or the like. The spray nozzle insert 10 is made separately by means of an injection moulding process, preferably also of polypropylene (PP). The fact that both the nozzle insert 10 and the cap body 2 and actuator 3 are made of PP facilitates the recycling of the spray cap 1, which can be discarded entirely in a plastic waste stream because the material of the nozzle insert 10 is similar or compatible with the material of the actuator 3 and cap body 2.

The configuration of the nozzle insert 10 as shown in the FIGS. 3-8, in particular the snap fingers 14, that are located at some distance from the cylindrical wall 13 allow the end wall 11 to be bent to some extent. This results in a pretension in the end wall 11 when the snap member 15 is interlocking with the inward end 31 of the guiding rib 30 as is shown in FIG. 12. This pretension has the effect that even when the plastic material, which is preferably PP, of the spray nozzle insert 10 would suffer from relaxation, the snap fingers 14 would still be sufficiently tightened to maintain the nozzle insert 10 on its place and in particular maintain the flat end surface 21 of the central post 18 of the nozzle head 9 in abutment with the annular area 11C of the inner side 11B of the end wall 11 of the nozzle insert 10. Thereby is warranted that the nozzle insert 10 is held in the actuator 3 in a sealing manner and that a good spray is created by the nozzle insert 10 and ejected through the orifice 12. Furthermore is warranted that the insert 10 is not ejected inadvertently from the actuator 3, inter alia by means of the second ribs 32, which prevent the fingers 14 to deform such that the snap members 15 would loose the interlock with the edge 31 of the first ribs 30.

It is noted that in the embodiment described in the above the aerosol dispensing device is embodied as a spray cap 1 having a cap body 2 and an actuator 3. It is to be understood though that this embodiment is to be considered as a non-limiting example. It is for example also possible that another embodiment of the dispensing device according to the invention only has an actuator which is positioned on the valve stem of the aerosol container. Such a dispensing device only having an actuator is sometimes referred to in the field as a Minimal Breakup Unit (MBU). MBU's are for example commonly used on aerosol containers containing paint.

It is furthermore noted that in the embodiment described in the above and shown in the figures, the parts of the spray cap 1 are formed in one piece by injection moulding. There are however also embodiments possible in which parts are formed separately which are then assembled. For example the flow channel 8 and the push button 7 are in the shown embodiment integrally formed, but it is very well possible to form the flow channel and the push button separately. The same goes for the cap body and the actuator. These may be formed in one piece, as shown in the figures, but might just as well be formed separately.

The invention claimed is:

1. An Aerosol dispensing device for placement on an aerosol container having a valve stem of an operable valve at the top of the container, the aerosol dispensing device comprising:

an actuator adapted to operate the valve stem of the container and including a flow channel having an inlet end adapted to be coupled with the valve stem of the aerosol container and an outlet end, wherein the actuator has a nozzle head at the outlet end of the flow channel, the nozzle head having a central post and a circumferential wall concentrically surrounding the central post, the central post and the circumferential wall defining between them an annular chamber, wherein the central post has a flat end surface at which the outlet of the flow channel is located, a spray nozzle insert comprising an end wall having a spray orifice therethrough, the end wall having an outer side and an inner side, wherein a cylindrical wall connected to the inner side of the end wall is arranged concentric with the spray orifice, the spray nozzle insert being positioned in the actuator, wherein the cylindrical wall of the spray nozzle insert is located in the annular chamber of the nozzle head and the flat end surface of the central post is in abutment with the inner side of the end wall of the spray nozzle insert, wherein the spray nozzle insert has at least two snap fingers located at a radial distance outside the cylindrical wall, said at least two snap fingers extending from the inner side of the end wall, wherein the actuator has at least two first guiding ribs spaced apart from an outer side of the circumferential wall of the nozzle head configured to guide each of said at least two snap fingers upon positioning the spray nozzle insert in the actuator, wherein each of said at least two snap fingers has a snap member which is snapped behind an inward end of each of said at least two first guiding ribs in a fully inserted state.

2. The Aerosol dispensing device according to claim 1, wherein the circumferential wall of the nozzle head defines a support surface, which supports an annular area of the inner side of the end wall of the spray nozzle insert adjacent the outside of the cylindrical wall of the insert.

3. The Aerosol dispensing device according to claim 2, wherein the distance between the support surface and the inward end of the first guiding rib is such that the spray nozzle insert is provided with a pretension when the spray nozzle insert is positioned in the actuator.

4. The Aerosol dispensing device according to claim 1, wherein spaced apart from the respective first guiding ribs respective second guiding ribs are formed, wherein during assembly the snap member of the respective at least two snap fingers moves through a passage formed by the first and second guiding ribs, wherein the second guiding rib locks the snap member in the snapped state when the snap member is snapped behind the inward end of the first guiding rib.

5. The Aerosol dispensing device according to claim 4, wherein the respective second guiding ribs are located inwardly from the respective first guiding ribs.

6. The Aerosol dispensing device according to claim 4, wherein the respective second guiding ribs have a guiding portion having an inclined orientation with respect to an insertion direction of the snap finger, which forces the snap member in the direction of the first guiding rib.

7. The Aerosol dispensing device according to claim 4, wherein the second guiding ribs are formed on the nozzle head.

8. The Aerosol dispensing device according to claim 1, wherein the spray nozzle insert is made of polypropylene.

9. The Aerosol dispensing device according to claim 1, wherein the actuator is made from polypropylene.

10. The Aerosol dispensing device according to claim 1, wherein the end wall of the spray nozzle insert has substantially an oblong shape, wherein said at least two snap fingers extend from opposite smaller sides of the oblong shape.

11. The Aerosol dispensing device according to claim 10, wherein said at least two snap fingers have the same width as the smaller sides of the oblong end wall.

12. The Aerosol dispensing device according to claim 1, wherein the inner side of the end wall of the insert is provided with a recessed swirl chamber surrounding the spray orifice and recessed feed grooves extending from the cylindrical wall towards the swirl chamber.

13. An aerosol cap comprising an aerosol dispensing device according to claim 1, further comprising a cap body having a circumferential wall and having an open bottom end to be placed on and connected with the aerosol container, wherein the actuator is hingedly connected to the cap body.

14. The aerosol cap according to claim 13, wherein the cap body and the actuator are formed in one piece.

15. An aerosol container provided with an aerosol dispensing device according to claim 1.

16. A method for manufacturing an aerosol dispensing device, including the following steps:

providing an actuator adapted to operate the valve stem of an aerosol container and including a flow channel having an inlet end adapted to be coupled with the valve stem of the aerosol container and an outlet end, wherein the actuator has a nozzle head at the outlet end of the flow channel, the nozzle head having a central post and a circumferential wall concentrically surrounding the central post, the central post and the circumferential wall defining between them an annular chamber, wherein the central post has a flat end surface at which the outlet of the flow channel is located, wherein the actuator has at least two first guiding ribs spaced apart from an outer side of the circumferential wall of the nozzle head;

providing a spray nozzle insert comprising an end wall having a spray orifice therethrough, the end wall having an outer side and an inner side, wherein a cylindrical wall connected to the inner side of the end wall is arranged concentric with the spray orifice, wherein the spray nozzle insert has at least two snap fingers located at a radial distance outside the cylindrical wall, said at least two snap fingers extending from the inner side of the end wall, wherein each of said at least two snap fingers has a snap member; and positioning the spray nozzle insert in the actuator, wherein the cylindrical wall of the spray nozzle insert is located in the annular chamber of the nozzle head and the flat end surface of the central post is brought in abutment with the inner side of the end wall of the spray nozzle insert, and wherein each of said at least two snap fingers is guided by one of said at least two first guiding ribs until the snap member snaps behind an inward end of each of said at least two first guiding ribs.

* * * * *